Patented Oct. 16, 1951

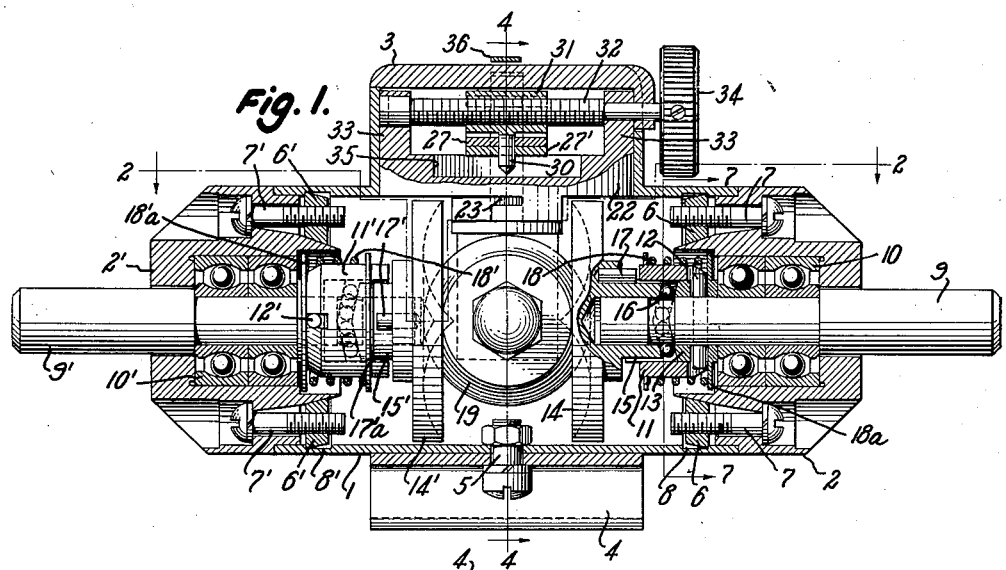

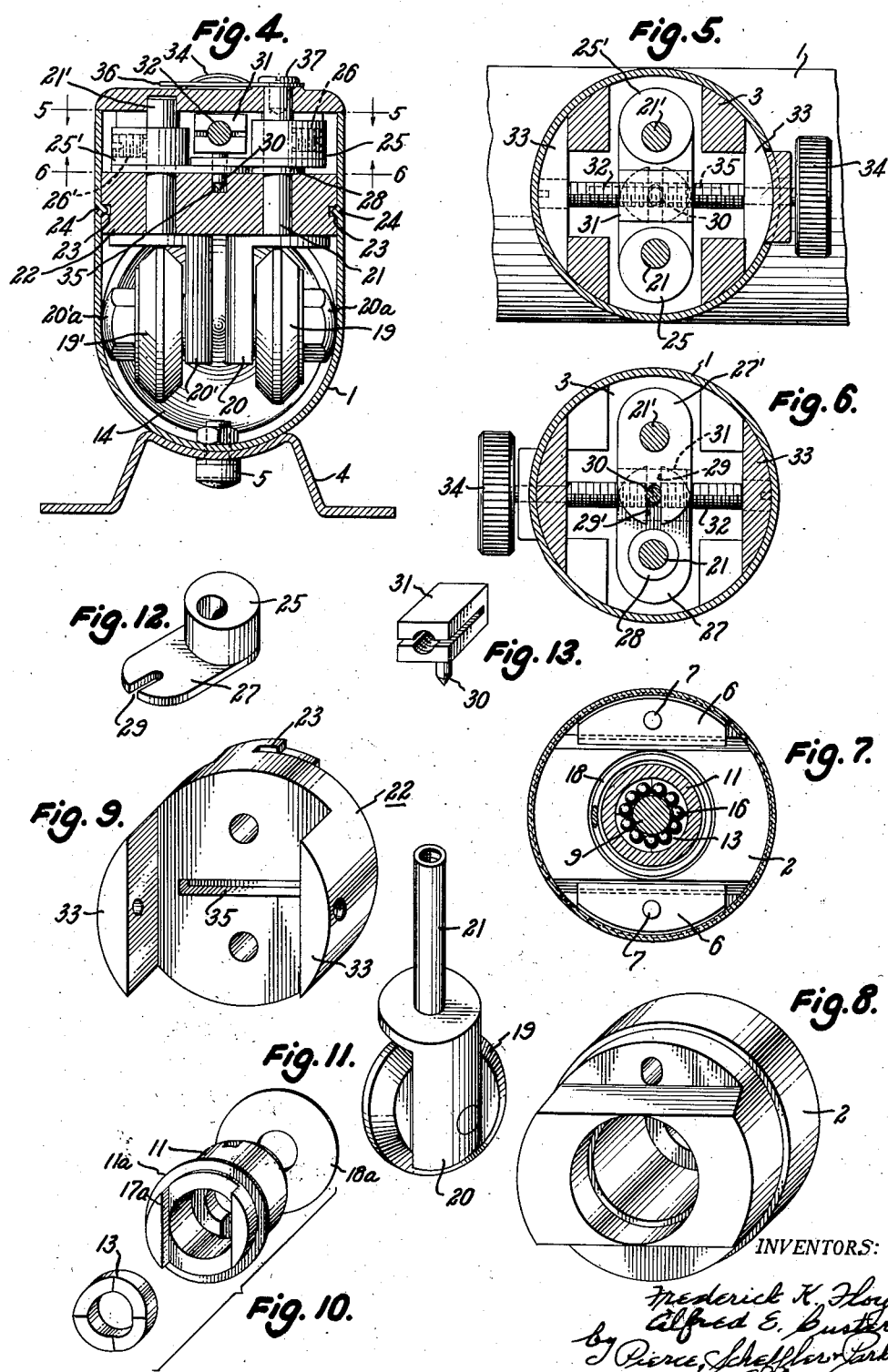

2,571,851

UNITED STATES PATENT OFFICE 2,571,851

VARIABLE RATIO SPEED CHANGER

Frederick K. Floyd and Alfred E. Custer, Denver, Colo., assignors to Metron Instrument Company, Denver, Colo., a corporation of Colorado Application August 29, 1949, Serial No. 112,934

9 Claims. (Cl. 74—200)

1

This invention relates to variable ratio speed changers, and more particularly to speed changers which afford a continuously variable or progressive adjustment of the ratio of transmission from a drive shaft to a driven shaft.

Objects of the invention are to provide variable speed changers of a friction type which are of simple, rugged and economical construction. Objects are to provide variable speed changers of the type including a pair of disks with opposed toroidal surfaces which are coupled by two idler friction wheels, and in which the driving and driven assemblies are of identical construction and symmetrically disposed with respect to a transverse plane through the axes about which the friction wheels are adjustable to vary the ratio of transmission. An object is to provide a variable speed changer of the type stated which includes a tubular casing of T-form, a driving and a driven assembly supported in axial alinement in the head of the T-form casing, and friction wheels supported by the stem portion of the T-form casing and adjustable to vary the ratio of transmission between the respective assemblies. An object is to provide a variable speed changer including friction wheels coupling two disks with opposed toroid faces engaged by the friction wheels, and shafts connected to the respective disks through mechanisms which automatically adjust the pressure between the friction wheels and the disks in accordance with the torque to be transmitted; the pressure adjusting mechanisms being so constructed as to limit the maximum pressure, thereby to protect the apparatus from damage in the event of overloads. Other and more specific objects are to provide variable speed changers in which the several components are shaped and related to facilitate manufacture in "miniature" size and of high precision for incorporation in measuring systems, automatic controls or regulators, and other low power devices.

These and other objects and the advantages of the invention will be apparent from the following specification when taken with the accompanying drawings in which:

Fig. 1 is a substantially central vertical section through a speed changer embodying the invention;

Fig. 2 is a plan view with parts in section on line 2—2 of Fig. 1;

Fig. 3 is a plan view;

Fig. 4 is a transverse section on line 4—4 of Fig. 1;

2

Figs. 5 and 6 are horizontal sections on lines 5—5 and 6—6, respectively, of Fig. 4;

Fig. 7 is a transverse section on line 7—7 of Fig. 1;

Fig. 8 is a perspective view of one of the end members;

Fig. 9 is a perspective view of the frame which supports the idler wheels;

Fig. 10 is an exploded perspective view of one of the ferrule and cam assemblies;

Fig. 11 is a perspective view of one of the idler wheels and its supporting shaft; and Figs. 12 and 13 are perspective views of elements of the mechanism for adjusting the shafts which carry the idler wheels.

In the drawings, the reference numeral 1 identifies a tubular metal shell of T-shape which, with end closures 2, 2' of molded plastic, constitutes the casing of the speed changer. The central opening of the shell is closed by a cap 3 which will be described in detail hereinafter, and a metal strap 4 is secured to the shell 1 opposite the cap 3 by welding or, as shown by a bolt 5, to constitute a mounting bracket for the casing.

The end closures each support a shaft and associated coupling mechanisms, and the assemblies at opposite sides of the central transverse plane of the casing are preferably of identical construction and symmetrically disposed with respect to the central plane. For simplicity and convenience, only the assembly associated with the end member 2 will be described in detail, and the corresponding parts at the opposite side of the casing will be identified by primed reference numerals.

The end member 2 is telescoped into and is secured to the casing shell 1 by a pair of cleats 6, 6 of approximately segment shape as viewed axially of the end member 2, and of rhomboidal shape in cross-section. The cleats are at the inner face of the end member 2 and are drawn down upon outwardly sloping surfaces of the member 2 by screws 7 to force the outer edges of the cleats into a circumferential groove 8 cut into the inner wall of the shell 1. A shaft 9 extends through the end member 2 and is supported by bearings 10 seated in a socket or counterbore at the inner face of the end member.

A cap or ferrule 11 is axially slidable on an intermediate portion of the shaft and is keyed thereto by a pin 12 fixed to the shaft and seating in a slot at the outer end of the ferrule. A cam 13 is force fitted into the ferrule 11 and has oppositely sloping end faces of 90° circumferential extent which provide two diametrically opposed high points. A disk 14 with a toroidal inner face is journalled on the inner end of the shaft 9 and has, at its outer side, a cam sleeve section 15 terminating in a hill-and-dale end surface complementary to the end surface of the cam 13 fixed to ferrule 11. Steel balls 16 are arranged between the cam surfaces to reduce the frictional resistance to relative angular movement of the cam elements, and such angular movement is limited by a pin 17 fixed to the disk 14 and seated within one of the circumferential notches 17a which extend less than 90° to either side of an axial plane through a low point of the cam 13. A light coiled spring 18 is arranged between a radial flange 11a of the ferrule 11 and a washer 18a which seats against the inner race of the ball bearing 10 to press the cam 13 into contact with the ring of steel balls 16, thereby holding the latter in engagement with the cam surface of the sleeve 15.

A pair of idler rollers 19, 19' are arranged between the disks 14, 14' associated with the shafts 9, 9', and the rollers have relatively narrow treads or surfaces for frictional engagement with the toroidal surfaces of the disks. The rollers 19, 19' are journalled on crank arms 20, 20' which are secured to shafts 21, 21' respectively, the crank arms being offset inwardly to such extent from shafts 21, 21' respectively that the axes of the supporting shafts 21, 21' lie in the planes of the tread surfaces of the idler rollers 19, 19' and, if extended, would pass through the axes of the rollers 19, 19' respectively. The studs 20a, 20'a which are threaded into the crank arms 20, 20' to support the rollers have spherical heads which contact the inner surface of the casing shell for additional stability in preventing the rollers from springing outwardly under load. The center of curvature of each spherical head is at the axis of angular adjustment of the associated crank arms 20 or 20', and the studs thus maintain contact with the shell throughout the range of angular adjustment of the shafts 21, 21'.

The shafts 21, 21' are journalled in a base or frame 22 of molded plastic which fits rather snugly into the stem section of the T-form shell 1 and has undercut or bayonet slots 23 for interlocking with indentations 24 of the shell. The shafts 21, 21' are anchored against axial displacement with respect to the frame 22 by collars 25, 25' which are secured to the shafts above the frame by set screws 26, 26'. Crank arms 27, 27' are secured, by staking or other appropriate means, to the collars 25, 25' and extend towards each other in overlapping relation with a spacing washer 28 arranged between the crank arm 27 and the upper surface of the frame 22. The overlapped ends of crank arms 27, 27' are provided with slots 29, 29' for receiving a pin 30 on a nut 31 which is threaded upon a screw 32 journalled in upward extensions 33 of the frame 22. A knob or milled head 34 is secured to one end of the screw 32 to facilitate rotation of the same to vary the ratio of motion or power transmission by rocking the crank arms 27, 27' in opposite directions. The nut 31 is preferably resilient, relatively long and split diametrically, whereby the split ends may be pressed towards each other after the nut is threaded to develop a frictional resistance to rotation of the screw to preclude an inadvertent adjustment of the screw. A slot 35 is provided in the upper surface of the frame 22 to guide the pin 30 of nut 31 along a linear path and to anchor the nut 31 against rotation.

The shaft 21 is extended through the cap 3 and a pointer 36 is secured to the outer end of shaft 21 by a screw 37, the pointer being movable along a scale 38 of speed ratios printed on or impressed in the surface of the cap 3.

Either the shaft 9 or the shaft 9' may be the drive shaft as motion or power may be transmitted in either direction through the described speed changer. Assuming that shaft 9 is the drive shaft, the speed changer may be operated in the following manner.

When shaft 9 is rotated, the disk 14 is not directly driven by shaft 9 as the disk 14 is journalled upon the shaft. The spring 18 presses the ferrule 11 and the disk 14 towards the idler rollers 19, 19' and thereby establishes a slight frictional resistance to rotation of the disk 14 by the shaft 9. The cams 13 and 15 are thereby displaced angularly in accordance with the resistance to rotation of shaft 9' to increase the pressure of disk 14 upon rollers 19, 19' until the latter rotate to drive the disk 14' and shaft 9'. The energy losses in the speed changer are thus adjusted automatically in accordance with the torque to be transmitted. However, in the case of an abnormal resistance to rotation, the maximum pressure or torque is limited to a safe value by the pin 17 of the disk 14 and its seating in the notch 17a of the ferrule 11. The output shaft 9' slows down when the pressure of disks 14, 14' on rollers 19, 19' reaches the maximum value corresponding to a preselected torque and further angular movement of the cam surfaces is positively blocked. The slippage under overload takes place at the idler rollers 19, 19' and not by way of a complete rotation of the cam surfaces which would result in excessive wear and damage.

The transmission ratio is 1-to-1 when the rollers 19, 19' are parallel to each other, as illustrated in Figs. 1 to 6, and it may be varied to provide a step-up or step-down of the speed of the driven shaft 9' by turning knob 34, and thereby the screw 32, to rock the rollers 19, 19' to increase or to decrease, respectively, the radius of their line of contact with the driving disk 14. The slots 29, 29' of the crank arms 27, 27' are linear and alined when rollers 19, 19' are parallel to each other, i. e. when the mechanism is adjusted for unity speed transmission, the relationship between angular adjustment of the speed change knob 34 and the speed ratio is approximately logarithmic and the graduations of the speed-change scale 38 are of course symmetrical about a central 1-to-1 mark. Other scale relationships may be had, as desired, by varying the shape of the slots 29, 29' of the crank arms 27, 27' to alter the relation between angular rotation of the screw 32 and angular adjustment of the crank arms 27, 27'.

The illustrated embodiment of the invention is particularly adapted for manufacture as miniature and precision speed changers for incorporation in measuring and control equipment. For example, in a miniature speed changer as now manufactured commercially, the disks 14, 14' have a diameter of 0.94 inch, the inner diameter of the casing shell 1 is just under 1 inch, and the height of the cam surfaces of elements 13 and 15 is 0.022–0.025 inch. The invention is not limited to these dimensions however as the apparatus may be constructed in larger sizes for the variable speed transmission of power at relatively high levels.

It is therefore to be understood that the invention is not limited to the apparatus as herein disclosed and described since various changes which may occur to those familiar with the design and construction of speed changers fall within the spirit and scope of the invention as set forth in the following claims.

We claim:

1. In a variable speed changer, a casing, a shaft extending into said casing, a disk with a toroidal inner face journalled upon the inner end of said shaft, a ball bearing having an outer race carried by said casing and an inner race supporting said shaft, and means for coupling said disk to said shaft for rotation thereby; said coupling means comprising a ferrule keyed to said shaft, a cam within and fixed to said ferrule, a cylindrical cam section at the outer face of said disk and within said ferrule, said cam and cam section having complementary and opposed cam surfaces for moving said disk inwardly along said shaft upon relative rotation of said shaft and said disk, a ring assembly of steel balls between said opposed cam surfaces, said balls being retained against radial displacement by said shaft and said ferrule respectively, and means limiting axial displacement of said disk to less than the throw of said cam surfaces.

2. In a variable speed changer, the invention as recited in claim 1, wherein said displacement limiting means includes cooperating stop elements on said disk and said ferrule.

3. In a variable speed changer, the invention as recited in claim 2, wherein said ferrule is provided with a circumferential notch constituting a stop element, and the cooperating stop element is a pin fixed to said disk and extending into said circumferential notch of said ferrule.

4. In a variable speed changer, the invention as recited in claim 1, wherein said ferrule has a flange adjacent its inner end and is provided with a diametrical slot at its outer end, and a pin extends through said shaft and is seated within said slot of the ferrule to permit axial movement of the ferrule on said shaft; in combination with a washer seated upon the inner end of said inner race of said ball bearing, and a coil spring between said washer and said ferrule flange to press said ferrule inwardly along said shaft.

5. In a variable speed changer, a casing shell including an elongated cylindrical section, end members closing the ends of said cylindrical section of the shell, shafts journalled in said end members, disks with opposed toroidal surfaces carried by the inner ends of said shafts, a pair of idler rollers between and having friction surfaces contacting said opposed toroidal surfaces, shafts with offset arms supporting said idler rollers, the axes of said supporting shafts when extended passing through the axes of the respective idler rollers in the planes of the friction surfaces thereof, a frame in which said supporting shafts are journalled, and means for adjusting said supporting shafts angularly in opposite directions, said adjusting means including crank arms secured to said supporting shafts and overlapped, said crank arms having slots therethrough, a pin extending through said slots, and means manually adjustable to displace said pin, thereby to displace said crank arms angularly in opposite sense.

6. In a variable speed changer, the invention as recited in claim 5, wherein said manually adjustable means includes a screw, and a nut threaded upon said screw and carrying said pin.

7. In a variable speed changer, the invention as recited in claim 6, in combination with a cap carrying a speed ratio scale, and wherein one of said supporting shafts extends through said cap and carries a pointer cooperating with said scale.

8. In a variable speed changer, a casing including a cylindrical shell section, end members secured to the opposite ends of said cylindrical shell section, axially alined shafts supported by the end members, disks with opposed toroidal surfaces carried by the inner ends of said shafts, a pair of idler rollers between and having frictional surfaces contacting said toroidal surfaces of the disks, and means supporting said rollers for adjustment to vary the ratio of transmission between said shafts; said supporting means comprising a pair of shafts with offset arms, and studs threaded into said arms to support the rollers for rotation, the ends of the studs being spherical to contact the inner wall of the cylindrical shell section of the casing.

9. In a variable speed changer, the invention as recited in claim 8, wherein the center of curvature of the head of each stud is at the axis of angular adjustment of the associated offset arm.

FREDERICK K. FLOYD.
ALFRED E. CUSTER.

REFERENCES CITED

The following references are of record in the file of this patent:

UNITED STATES PATENTS

| Number | Name | Date |
| --- | --- | --- |
| 517,443 | Cummings | Apr. 3, 1894 |
| 682,763 | Spencer | Sept. 17, 1901 |
| 1,401,505 | Sykora | Dec. 27, 1921 |
| 1,833,475 | Standish | Nov. 24, 1931 |
| 1,846,456 | Robertson et al. | Feb. 23, 1932 |
| 1,853,749 | Sharpe | Apr. 12, 1932 |
| 1,903,228 | Thomson | Mar. 28, 1933 |
| 2,134,225 | Christiansen | Oct. 25, 1938 |
| 2,205,031 | Bugden | June 18, 1940 |
| 2,218,651 | Lenney | Oct. 22, 1940 |